G. W. Storer,
Tag.
No. 59,678.      Patented Nov 13, 1866.
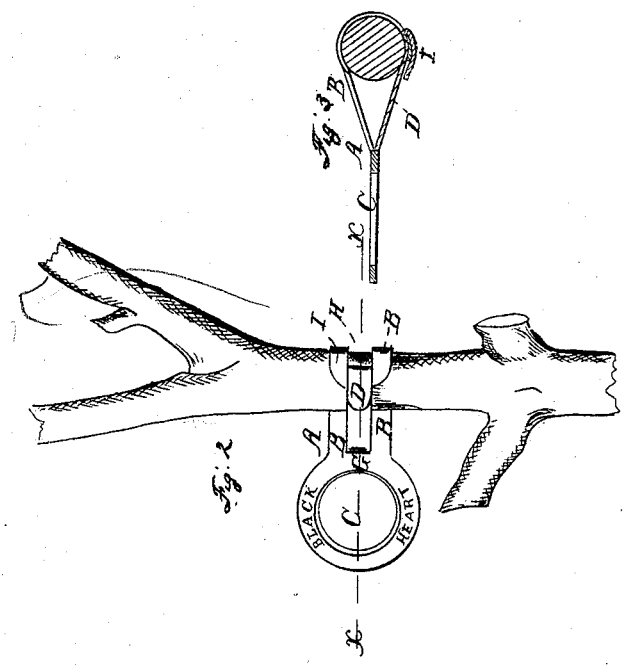
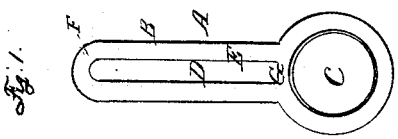
Witnesses,
F. A. Jackson
Wm. Brown
Inventor.
G. W. Storer
Per Munn & Co
Attorneys

UNITED STATES PATENT OFFICE.

GEO. W. STORER, OF PORTLAND, CONNECTICUT.

TAG OR LABEL.

Specification forming part of Letters Patent No. 59,678, dated November 13, 1866.

*To all whom it may concern:*

Be it known that I, GEORGE W. STORER, of Portland, in the county of Middlesex and State of Connecticut, have invented a new and Improved Tag or Label; and I do hereby declare that the following is a full, clear, and exact description thereof, which will enable others skilled in the art to make and use the same, reference being had to the accompanying drawings, forming part of this specification.

The present invention relates to an improved tag or label especially intended to be used upon trees, shrubs, vines, and other plants, although it can be employed for other and various purposes; and this invention consists in so forming the tag or label, made either of sheet metal or other suitable flexible material, that it can be secured to and around the tree, shrub, vine, or other plant or other article without requiring the use of an additional or extra fastening device or devices, and without the least injury or damage to the article to which it is applied.

In the accompanying plate of drawings my improved tag or label is illustrated, Figure 1 being a view of my improved tag or label before being applied to a tree or other plant or article; Fig. 2, an elevation of a tree having my improved tag applied to it; and Fig. 3, a section taken in the plane of the line $x\ x$, Fig. 2.

Similar letters of reference indicate like parts.

A in the drawings represents my improved tag or label, which may be made of sheet metal, either in part or whole, or of any other suitable flexible material at such portions of the same (to be hereinafter specified) as are folded or bent around the tree, shrub, vine, or other plant or other article to which the tag is to be secured or applied. This tag A, in the present instance, consists of a straight portion, B, rounded at one end, and at its other terminating in a circular-shaped plate or disk, C, on which it is intended to indicate, by printing, painting, stamping, or in any other proper manner, the name or title of the tree, &c., for which the tag or label is to be used. The straight portion B for its entire length is stamped out with a center tongue, D, that along its sides E, as well as one end, F, is free, while at the other end, G, or that toward the circular plate C, it is left attached or hung to the said plate.

In using my improved tag, formed as above described, the tongue D is first bent outward, and then the straight portion B bent partially around the tree, when, passing the tongue D through the slot H, formed in the straight portion B by the stamping out of the tongue D, and bending over the rounded end I of the same, the tag is thereby firmly and tightly secured or fastened to the tree, as is obvious without any further explanation.

Although I have hereinabove described one manner in which my improved tag may be made, it is plainly apparent that it may be changed in many respects, not only in its form, style, and shape, but also by forming the tag in several parts or pieces and then securing them together; but I deem the mode explained to be the best, as it is not only cheap and simple, but a most desirable and practical tag thereby produced for the purpose specified, to which it is to be more particularly applied or adapted.

I claim as new and desire to secure by Letters Patent—

An improved tag or label made and applied substantially in the manner described, for the purpose specified.

GEO. W. STORER.

Witnesses:
 GEO. O. JARVIS,
 MARY J. EDWARDS.